(12) United States Patent
Denneler et al.

(10) Patent No.: US 10,795,563 B2
(45) Date of Patent: Oct. 6, 2020

(54) VISUALIZATION OF A NETWORK MAP USING CAROUSELS

(71) Applicant: ARRIS Enterprises LLC, Suwanee, GA (US)

(72) Inventors: Charles Ross Denneler, Lawrence, KS (US); Frederick Weidling, Charleston, SC (US); Brendon Milton Allen, Lawrence, KS (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/353,268

(22) Filed: Nov. 16, 2016

(65) Prior Publication Data

US 2018/0136809 A1 May 17, 2018

(51) Int. Cl.
*G06F 3/0485* (2013.01)
*G06F 3/0481* (2013.01)
*G06F 3/0488* (2013.01)
*G06T 11/20* (2006.01)
(Continued)

(52) U.S. Cl.
CPC .......... *G06F 3/0485* (2013.01); *G06F 3/0488* (2013.01); *G06F 3/04817* (2013.01); *G06T 11/206* (2013.01); *H04L 41/12* (2013.01); *H04L 43/045* (2013.01); *G06T 2200/24* (2013.01); *H04L 41/22* (2013.01)

(58) Field of Classification Search
CPC .. G06F 3/0485; G06F 3/04817; G06F 3/0488; G06T 11/206; H04L 41/12; H04L 43/045; G04L 41/22
See application file for complete search history.

(56) References Cited

U.S. PATENT DOCUMENTS 5,796,951 A * 8/1998 Hamner .............. H04L 41/0233
  709/223
9,203,717 B2 * 12/2015 Wei ..................... H04L 43/0811
  (Continued)

FOREIGN PATENT DOCUMENTS

WO  97/23831 A1  7/1997

OTHER PUBLICATIONS

PCT International Search Report & Written Opinion, Re: Application No. PCT/US2017/060891, dated Feb. 19, 2018.

*Primary Examiner* — Anil K Bhargava
(74) *Attorney, Agent, or Firm* — Wenderoth Lind & Ponack L.L.P.

(57) ABSTRACT

A method for displaying a network map retrieves state information for a plurality of network devices in communication with a network. The network devices include infrastructure devices and terminal devices. A topology map is generated based on the retrieved state information. A visual image of the topology map is caused to be displayed on a display screen. The visual image includes a first plurality of distinct content items arranged as a first rotatable carousel presented in a perspective view. The first rotatable carousel is configured to be scrolled in response to user input. At least some of the distinct content items are each associated with one of the terminal devices and present information describing the terminal device with which it is associated. The visual image also includes a second plurality of distinct content items which are each associated with one of the infrastructure devices.

19 Claims, 8 Drawing Sheets

(51) Int. Cl.
*H04L 12/24* (2006.01)
*H04L 12/26* (2006.01)

(56) References Cited

U.S. PATENT DOCUMENTS

| | | | |
|---|---|---|---|
| 2001/0029536 A1* | 10/2001 | Valentine | H04L 29/12018 709/224 |
| 2006/0004873 A1* | 1/2006 | Wong | G06F 17/30572 |
| 2006/0073832 A1 | 4/2006 | Pfister | |
| 2007/0186177 A1* | 8/2007 | Both | G06F 3/04817 715/764 |
| 2007/0223530 A1 | 9/2007 | Shimoda et al. | |
| 2007/0280165 A1* | 12/2007 | Doshi | H04L 41/12 370/331 |
| 2008/0295037 A1* | 11/2008 | Cao | G06F 3/0482 715/852 |
| 2010/0064225 A1 | 3/2010 | Cunningham et al. | |
| 2010/0110932 A1* | 5/2010 | Doran | H04L 41/12 370/254 |
| 2010/0175098 A1 | 7/2010 | Zustak et al. | |
| 2011/0205162 A1* | 8/2011 | Waller | B60K 35/00 345/173 |
| 2013/0047079 A1* | 2/2013 | Kroeger | G06F 17/212 715/273 |
| 2013/0106690 A1* | 5/2013 | Lim | G07F 13/065 345/156 |
| 2013/0232148 A1* | 9/2013 | MacDonald | G06F 17/30873 707/740 |
| 2014/0059440 A1* | 2/2014 | Sasaki | H04L 41/145 715/735 |
| 2014/0082116 A1* | 3/2014 | Sasaki | H04L 41/12 709/208 |
| 2015/0070283 A1 | 3/2015 | Irwin | |
| 2015/0082200 A1 | 3/2015 | Barker et al. | |
| 2015/0287073 A1 | 10/2015 | Liu et al. | |
| 2015/0319045 A1 | 11/2015 | Boulter et al. | |
| 2016/0026371 A1 | 1/2016 | Lu et al. | |
| 2016/0050165 A1* | 2/2016 | Thomas | G06F 3/04855 715/752 |
| 2016/0088060 A1 | 3/2016 | Rahman et al. | |
| 2016/0132217 A1 | 5/2016 | Asokan et al. | |
| 2016/0191357 A1* | 6/2016 | Orner | H04L 41/12 370/328 |
| 2016/0224208 A1* | 8/2016 | Bugajski | G06F 3/04817 |
| 2017/0093625 A1* | 3/2017 | Pera | H04L 41/0813 |
| 2017/0192626 A1* | 7/2017 | Virk | G06F 3/0482 |
| 2017/0371533 A1* | 12/2017 | Banguero | G06F 3/04883 |
| 2018/0067641 A1* | 3/2018 | Lerner | G06F 3/04883 |

\* cited by examiner

FIG. 5

VISUALIZATION OF A NETWORK MAP USING CAROUSELS

BACKGROUND

As home networks proliferate and improve, they grow more complex with the addition of new devices. For example, a home network may interconnect many types of electronic devices such as personal computers, tablets, smartphones, input/output devices, entertainment system components and other types of home appliances. With each device, there are usually large numbers of parameters that must be properly set to ensure compatibility and functionality within the network. At present, configuration management for home networks typically entails a high degree of user interaction with the applications and devices, and a potentially high level of interaction with service providers, application vendors, or other third party content providers. Typically, however, most users are not interested in the details of networking interconnections until a connectivity problem arises. Even technical users can be daunted by visualizing and understanding network participation and connectivity, let alone undertake initial connections of new devices to the networks typically accompanied by authentication and handshaking protocols, updating devices with new software, etc.

One particular shortcoming of existing network management and discovery systems concerns how they visually represent electronic devices in a network, particularly on a mobile device with relatively small displays. Electronic devices may be shown as logical devices in a logical network map that may present the network as a tree or graph. Such a graphical representation can be difficult to view on a small display and may require panning and zooming to fully examine.

SUMMARY

In accordance with one aspect of the disclosed subject matter, a method is provided for displaying a network map. In accordance with the method, state information is retrieved for a plurality of network devices in communication with a network. The network devices include infrastructure devices and terminal devices. A topology map is generated based on the retrieved state information. A visual image of the topology map is caused to be displayed on a display screen. The visual image includes a first plurality of distinct content items arranged as a first rotatable carousel presented in a perspective view. The first rotatable carousel is configured to be scrolled in response to user input. At least some of the distinct content items are each associated with one of the terminal devices and present information describing the terminal device with which it is associated. The visual image also includes a second plurality of distinct content items which are each associated with one of the infrastructure devices and present information describing one of the infrastructure devices with which it is associated.

In one particular implementation, the second plurality of distinct content items is arranged as a second rotatable carousel and the second rotatable carousel is configured to be scrolled in response to user input. In addition, the first rotatable carousel may be infinitely rotatable when scrolled in response to user input.

BRIEF DESCRIPTION OF THE DRAWINGS

FIG. 5 shows a screen with additional information that may be presented when the network device entitled "Bedroom iMAC" shown in FIG. 4 is selected.

DETAILED DESCRIPTION

In the following description, numerous specific details are set forth in order to provide a thorough understanding of exemplary embodiments or other examples described herein. However, it will be understood that these embodiments and examples may be practiced without the specific details. In other instances, well-known methods and procedures have not been described in detail, so as not to obscure the following description. Further, the embodiments disclosed are for exemplary purposes only and other embodiments may be employed in lieu of, or in combination with, the embodiments disclosed.

Figure 1:
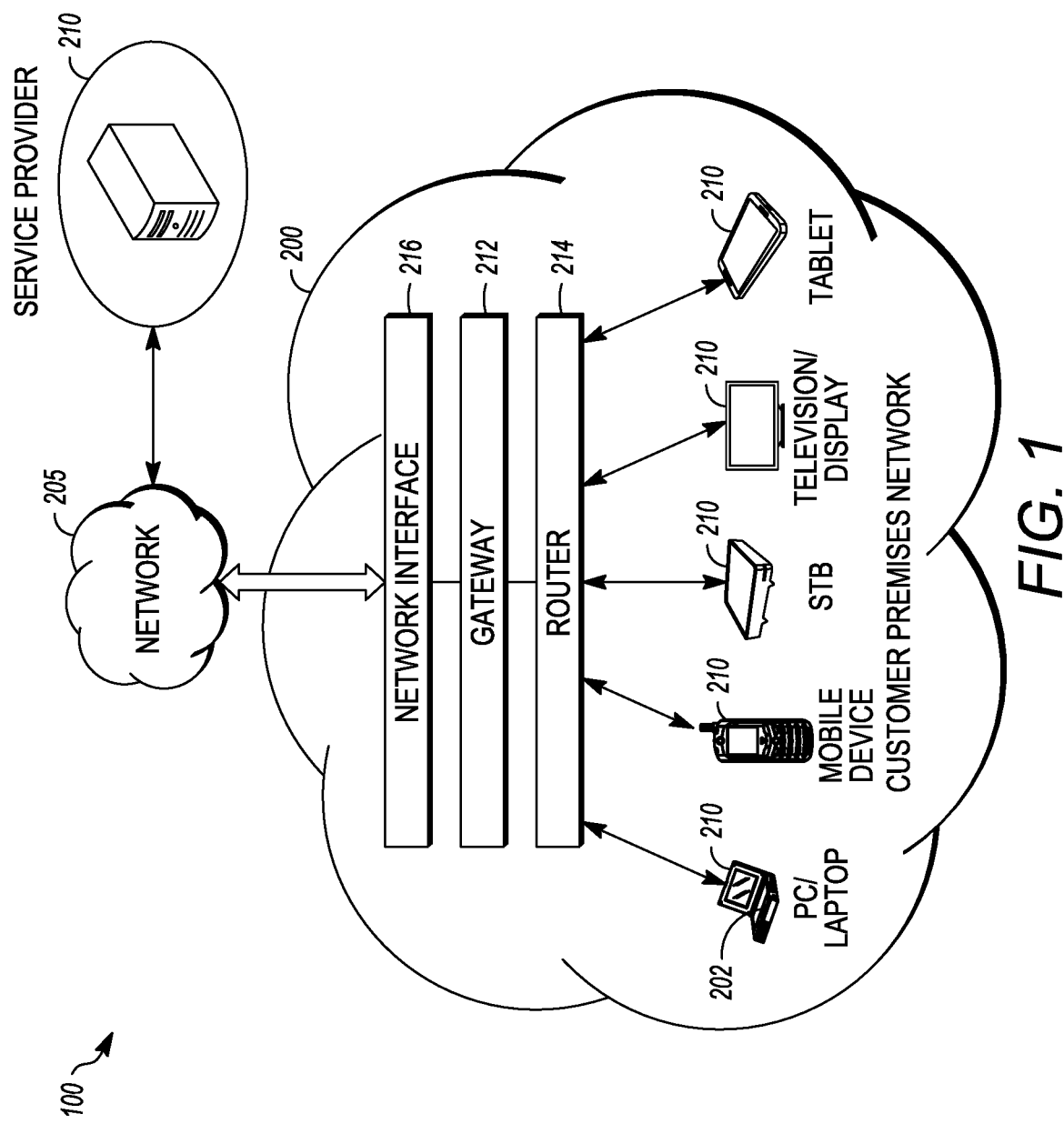
FIG. 1 illustrates one example of an operating environment in connection which aspects of the techniques described herein may be employed.

Reference throughout this specification to "one embodiment", "an embodiment", "one example", "an example", "one implementation", "an implementation", and so on, means that a particular feature, structure or characteristic described in connection with the embodiment, example or implementation is included in at least one embodiment of the present invention. Thus, appearances of the aforementioned phrases and similar phrases in various places throughout this specification are not necessarily all referring to the same embodiment, example or implementation. Furthermore, the particular features, structures or characteristics may be combined in any suitable combinations and/or subcombinations in one or more embodiments, examples or implementations. In addition, it is appreciated that the figures provided herewith are for explanation purposes to persons ordinarily skilled in the art and that the drawings are not necessarily drawn to scale. In FIG. 1 and the figures that follow, like elements are denoted by like reference numerals.

FIG. 1 illustrates one example of an operating environment in connection which aspects of the techniques described herein may be employed. As shown, a customer premises network 200 receives internet access and various services from service providers (e.g., service provider 210) over a network 205. Network 205 may be any type of network whether wired, wireless or any combination thereof. For example, network 205 may be a wide area network (WAN) such as the Internet or an intranet. As another example, network 212 may be a cellular network (e.g., 3G, CDMA). In yet another example, network 205 may be a content delivery system such as a broadcast television network, cable data network (e.g. an all-coaxial or a hybrid-fiber/coax (HFC) network), an xDSL (e.g., ADSL, ADLS2, ADSL2+, VDSL, and VDSL2) system, or a satellite television network. In yet other examples the network 205 may be a combination of two or more different types of networks.

A network interface 216 is located at the customer premises 200. The network interface 216 is used to establish communication over the network 205. Network interface 216 may be any of a variety of different types of network interfaces depending on the type of network 205 that is employed. For instance, network interface 216 may be a fiber optic network interface, a cable modem or other type of network interface. A customer premises gateway 212 is communicatively coupled to the network interface 216 by, for example, an Ethernet cable. The customer premises gateway 212 converts the data received from the network interface 216 to a format suitable for distribution to client devices by a router. For instance, the customer premises gateway 212 may convert the data from a link layer protocol such as cable/DOCSIS or DSL to Ethernet. In some cases the functionality of the network interface 216 and the customer premises gateway 212 may be included in a single device.

A router 214 is in turn communicatively coupled to the customer premises gateway 212. The router 214 is capable of wired and/or wireless communication with various devices 210 such as televisions, set top boxes, wireless mobile devices, smartphones, tablets, PDAs, entertainment devices such as video game consoles, consumer electronic devices, PCs, etc. The router 214 establishes a local area network (LAN) with the aforementioned devices. The LAN may operate in accordance with any wired and/or wireless protocol such as Ethernet, Wi-Fi (i.e., IEEE 802.11), Multimedia over Coax (MoCA) and power-line communication technologies. In some embodiments the functionality of the gateway 212 and the router 214, or even the gateway 212, router 214 and network interface 216, may be included in a single device. The various devices shown in the customer premises network of FIG. 1, including the gateway 212, router 214, and network interface 216 and the different client devices will be collectively referred to herein as network devices.

As previously mentioned, network management and discovery systems may provide a visual network map of a network such as the customer premises network shown in FIG. 1. Such a map may be used by a customer, for instance, to assist during the installation and maintenance of network devices. Various examples of a network map are illustrated below which present the information in a format that is accessible and easily navigable, particularly when presented on a small display such as those employed by mobile devices.

Figure 2:
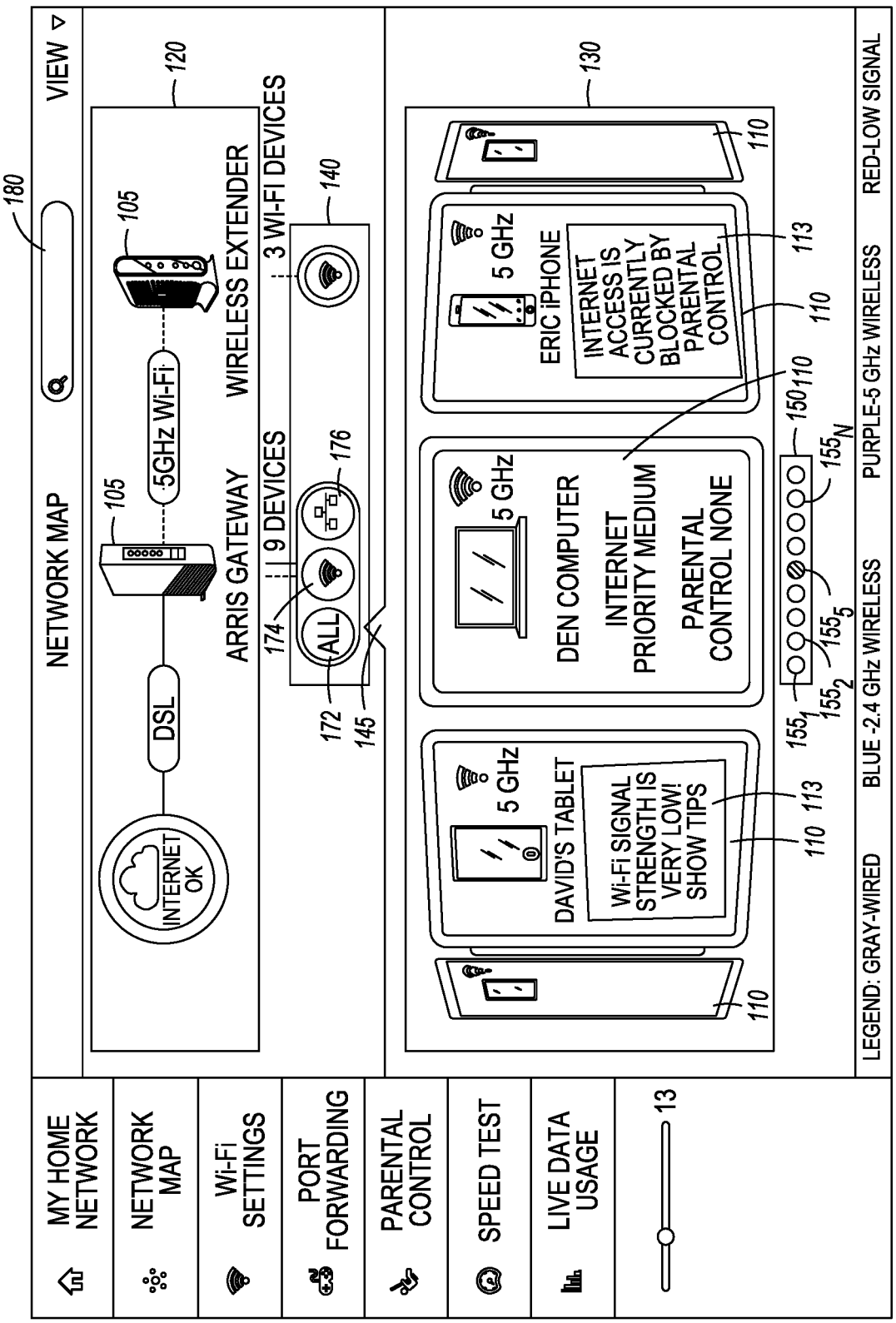
FIG. 2 shows one example of a network map that includes a plurality of distinct slides, tiles, cards or other images that represent network devices such as the network devices shown in FIG. 1.

FIG. 2 shows one example of a network map that includes a plurality of distinct slides, tiles, cards or other images that represent network devices such as the network devices shown in FIG. 1. For convenience such images will hereinafter be referred to as cards 105 and 110. In some embodiments the network map may be presented on the display of a computing device such as a wireless mobile device, smartphone, tablet, PDA, personal computer, television or other consumer electronic devices. The network map may be accessed on the consumer electronic device in a number of different ways. For instance, it may be accessed through a web browser, an application native to the operating system of the device, a third-party application, and so on.

In some embodiments the display on which the network map is presented may be a touch screen that provides an electronic visual display of visual content that the user can control using simple or multi-touch gestures by touching the screen with one or more fingers. In some embodiments, the user may also provide user-directed movement via an object (e.g., a stylus). In other embodiments the display may not have touch screen capabilities. Rather, the user can control display of the visual content using other input devices such as a keyboard and mouse, for example. In yet other embodiments audio commands may be used to control the visual content.

Network devices that are represented by the cards 110 are terminal devices, which are endpoint devices such as computers, mobile phones, cameras, printers, tablets and so on. Network devices represented by cards 105 are intermediate or infrastructure devices, which are devices that provide network connectivity to endpoint devices or connectivity between endpoint devices. Examples of infrastructure devices include gateways, hubs, routers, switches, network extenders and the like.

As further shown in FIG. 2 the cards 105 and 110 may be organized into one or more scrolling carousels such as carousels 120 and 130. Each carousel is an n-sided polygon, where n is the number of cards in the carousel. In some embodiments, each carousel may comprise a large number of cards, only a small number of which are presented on the display at the same time. The carousels may be configured to enable the user to scroll through its cards using any of the aforementioned input devices. For instance, if the display is a touch screen the user can scroll though the cards via user-directed movement across the touch screen. Likewise, a keyboard or mouse may be used to scroll through the cards. Regardless of the input device that is used, the user can browse through all of the cards of the carousels, moving back and forth.

In the particular example of the network map shown in FIG. 2, the network devices that are represented by the cards of the carousel 120 are infrastructure devices and hence carousel 120 may be referred to as infrastructure carousel 120. Likewise, the network devices represented by the cards of the carousel 130 are terminal devices as hence carousel 130 may be referred to as terminal device carousel 130.

The carousels may be presented as two-dimensional images, such as is the case for infrastructure carousel 120 in FIG. 2. Alternatively, in some embodiments the carousels may be presented in a perspective view to give them the appearance of three-dimensional structures, such as is the case for terminal device carousel 130 in FIG. 2. If a carousel is shown as a three dimensional structure, the size of the carousel can be controlled to determine the number of network devices that are fully visible at any one time. For instance, in FIG. 2 terminal device carousel 130 is sized so that three cards 110 are fully visible at the same time. Two additional cards 110 are also shown as being visible in part. The size of the carousel, and hence the number of cards that can be simultaneously displayed, may be predetermined or it may be a user-configurable parameter. In some cases the carousel may have a minimum size. If the number of network devices to be displayed is fewer than the minimum number of cards that can be presented on a carousel, an empty space may be shown in place of the cards that would otherwise be presented.

In one embodiment, the cards 110 in the terminal device carousel 130 may present information that is pertinent to the terminal device it represents. For example, the cards may include any combination of the following information: a representational image or picture of the device, device name, connection type, signal strength, setting, IP address, MAC address, parental control status, and so on. In other embodiments the information included in the cards may be limited to the name of the terminal device it represents, or simply the terminal device name and some other limited information.

Additional information may be periodically presented on the cards in the event of an anomalous condition, state, status or error that is to be communicated to the user. The additional information may be presented in the form of a message 113 that is made to appear distinct from the information that is normally presented on the card. For instance, the message 113 may be presented so as to appear as a so-called "sticky note," possibly distinguishing it from the other information by its font and/or color. In some cases the color of the message 113 may be used to indicate the severity of the condition In some embodiments one or more filters may be presented on the network map, which allow the user to filter the particular types of network devices that are presented on the network map. For example, a connection type filter may be provided, which limits the terminal devices presented on the terminal device carousel 130 to only those that are connected to the network using a selected type of network connection. That is, the only cards 110 in the terminal device carousel 130 that will be presented are those having the specified type of connection. FIG. 2 shows one example of such a connection type filter 140, which allows the user to selectively show all network-connected terminal devices on the terminal device carousel 130, only wireless connected terminal devices or only wired connected terminal devices.

In the example in FIG. 2 the connection type filter 140 is located between the network carousel 120 and the terminal device carousel 130 so that the changes caused to the carousels 120 and 130 by the user's selection can be easily visualized. The connection type filter 140 includes icons 172, 174 and 176, representing terminal devices having all types of network connections, only wireless network connections and only wired network connections, respectively. A pointer 145 originating at the terminal device carousel 130 points to the connection type that is currently selected. In some embodiments the icons also may allow the user to filter the network devices by the particular network protocol that is employed, such as Ethernet, Wi-Fi (i.e., IEEE 802.11), Multimedia over Coax (MoCA) and power-line communication technologies, for example.

Of course, the connection type filter presented above is only one example of a filter that may be used to select different subsets of network devices on the carousels. More generally a variety of other types of filters may be provided. For example, another illustrative filter may limit the terminal devices presented on the terminal device carousel 130 to one or more selected types (e.g., mobile terminals).

In some embodiments the network map may include a device selector that allows the user to select the card 110 corresponding to a selected device to be shown at the front and center of the terminal device carousel 130. One example of a device selector is shown in FIG. 2. In this example the device selector 150 is arranged as a series of user-selectable icons 155, each of which corresponds to a card for one of the terminal devices. In the example of FIG. 2 the user selectable icons are dots or so-called radio buttons $155_1$, $155_2$, . . . $155_n$ ("155"), where n is the number of cards 110 included in the terminal device carousel 130. In this example the dots 155 are arranged in a row. The centermost dot 155 (dot $155_5$ in this example), which may be highlighted, represents the card that is currently front and center on the terminal device carousel 130. By selecting any one of the icons 155, the terminal device carousel 130 will appear to rotate to the card 110 corresponding to the selected icon. In this way the user can quickly jump to any card 110 (and hence any desired terminal device).

Figure 3:
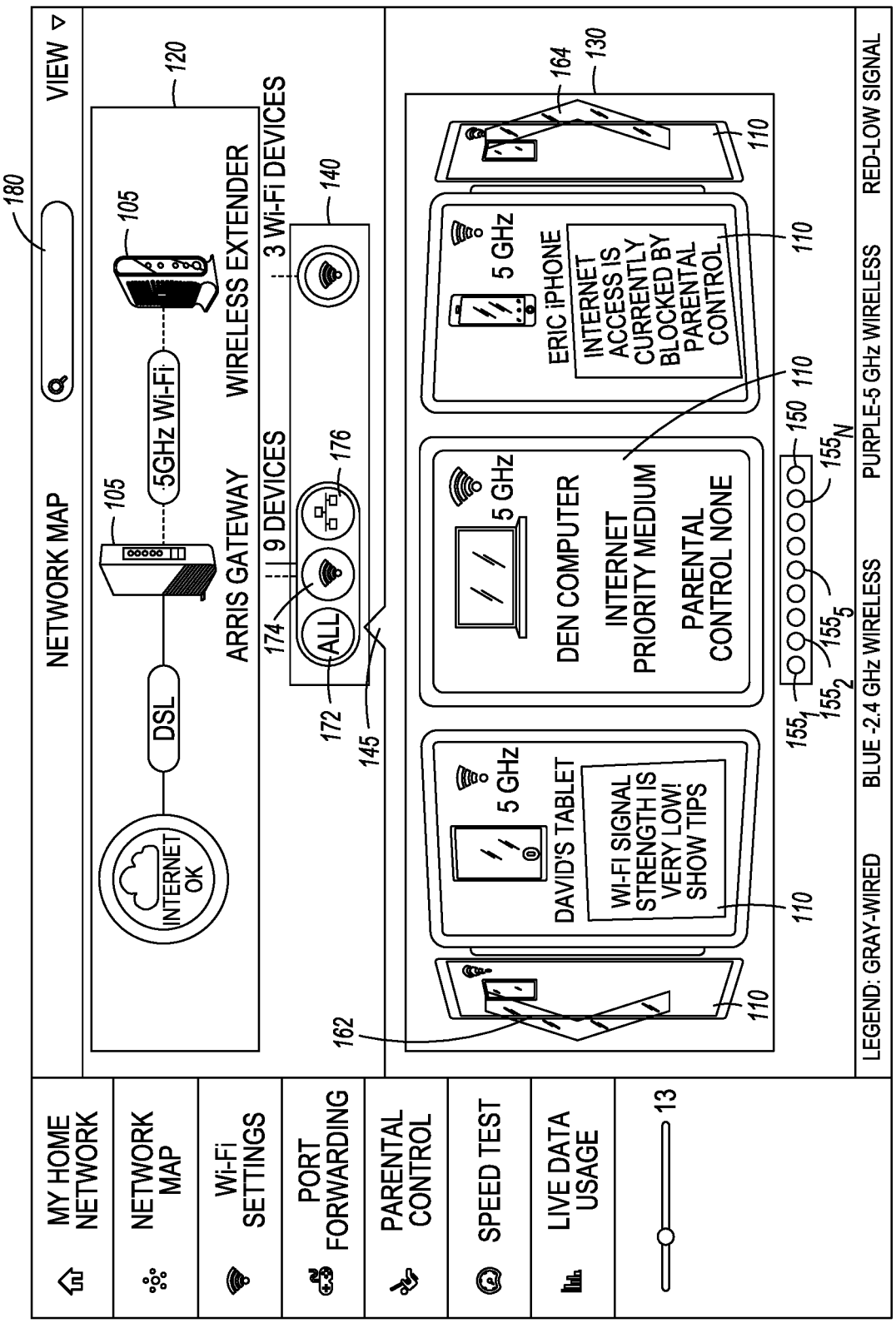
FIG. 3 shows another example of a network map in which arrows are shown for rotating the terminal carousel.

As previously mentioned, in some embodiments the network map may be configured for display on a touch-screen. In this case user gestures may be used to interact with the network map. For instance, a finger or stylus may be used to rotate or spin the carousels 120 and 130 by dragging them. For instance, a user gesture that swipes one of the carousels to the right will cause the carousels to rotate from right to left, and vice versa. In some embodiments the carousels 120 and 130 may be infinitely rotatable so that they can be rotated from left to right or right to left without reaching a stopping point. In those embodiments in which an alternative input device is used such as a mouse, user selectable icons such as arrows may appear when a cursor hovers over one of the carousels. For instance, in FIG. 3, arrows 162 and 164 are shown in response to a cursor hovering over the carousel 130. By selecting the left-facing arrow 162, the user can cause the carousel 130 to appear to rotate from right to left. Likewise, by selecting the right-facing arrow 164, the user can cause the carousel 130 to appear to rotate from left to right. By holding down the arrows the user can cause the carousels to continuously rotate. Of course, other techniques may be employed in addition to or instead of the techniques described above for allowing interactivity between the user and the carousels and cards.

Figure 4:
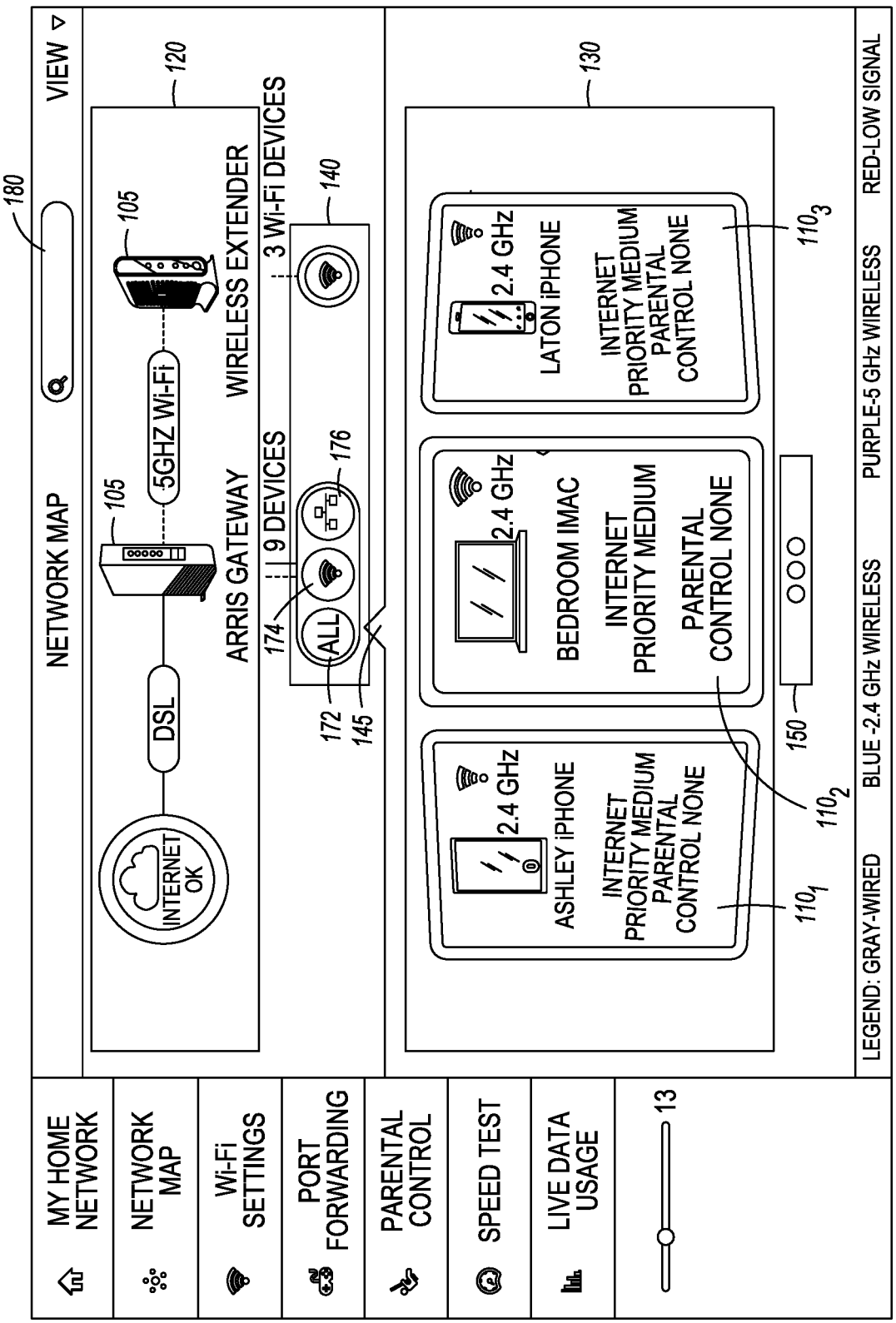
FIG. 4 shows another example of a network map in which a network device network device entitled "Bedroom iMAC" is shown front and center on the terminal carousel.
Figure 5:
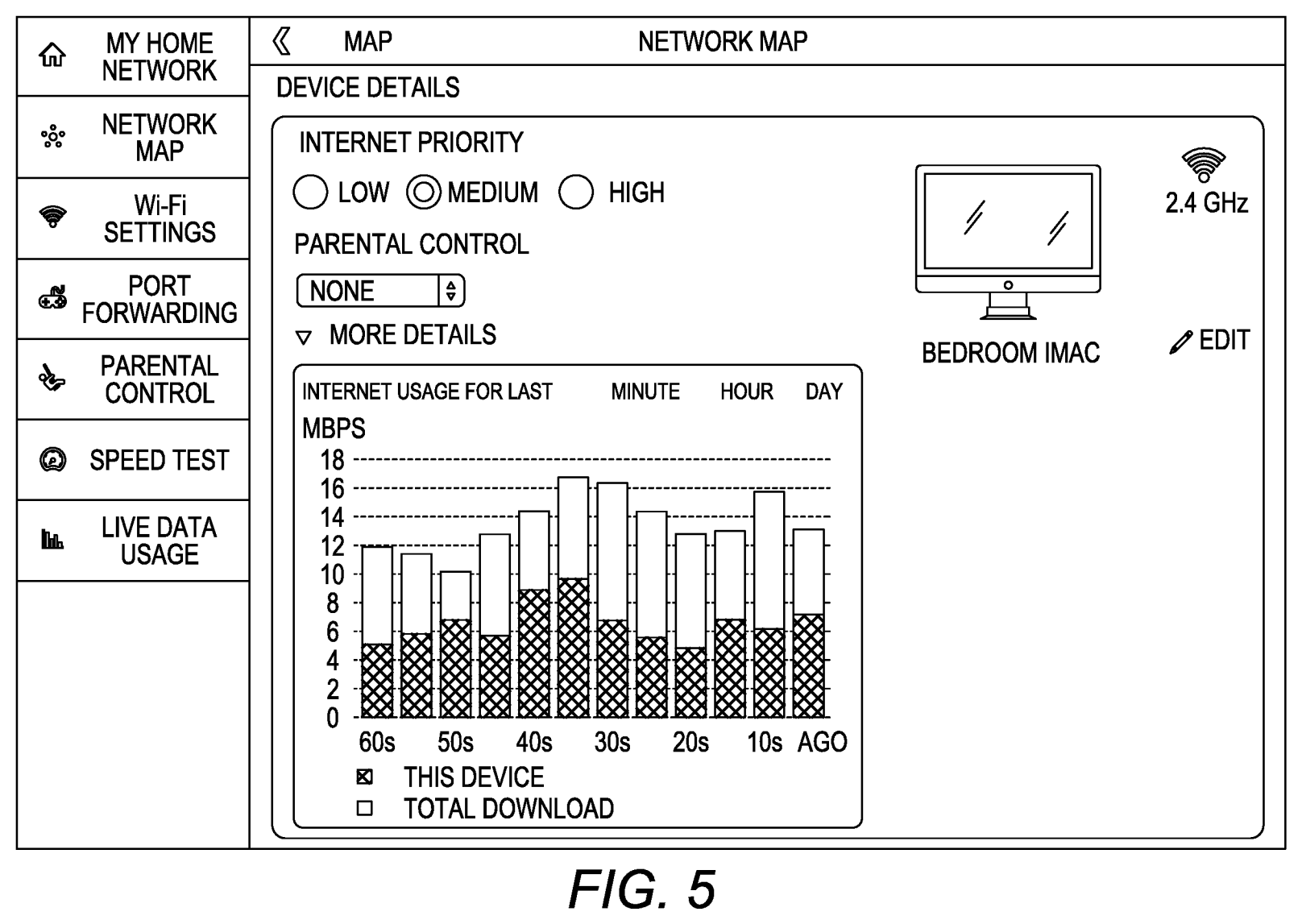

In some embodiments the cards 105 and 110 are themselves user-selectable icons. By selecting a given card additional information about the network device represented by that card can be displayed. For instance, by selecting the terminal device card $110_2$ shown in FIG. 4 for the network device entitled "Bedroom iMAC," the screen shown in FIG. 5 will be presented showing additional information for this network device. Likewise, selecting one of the infrastructure cards 105 may cause additional information to be presented about the infrastructure device represented by that card.

Figure 6:
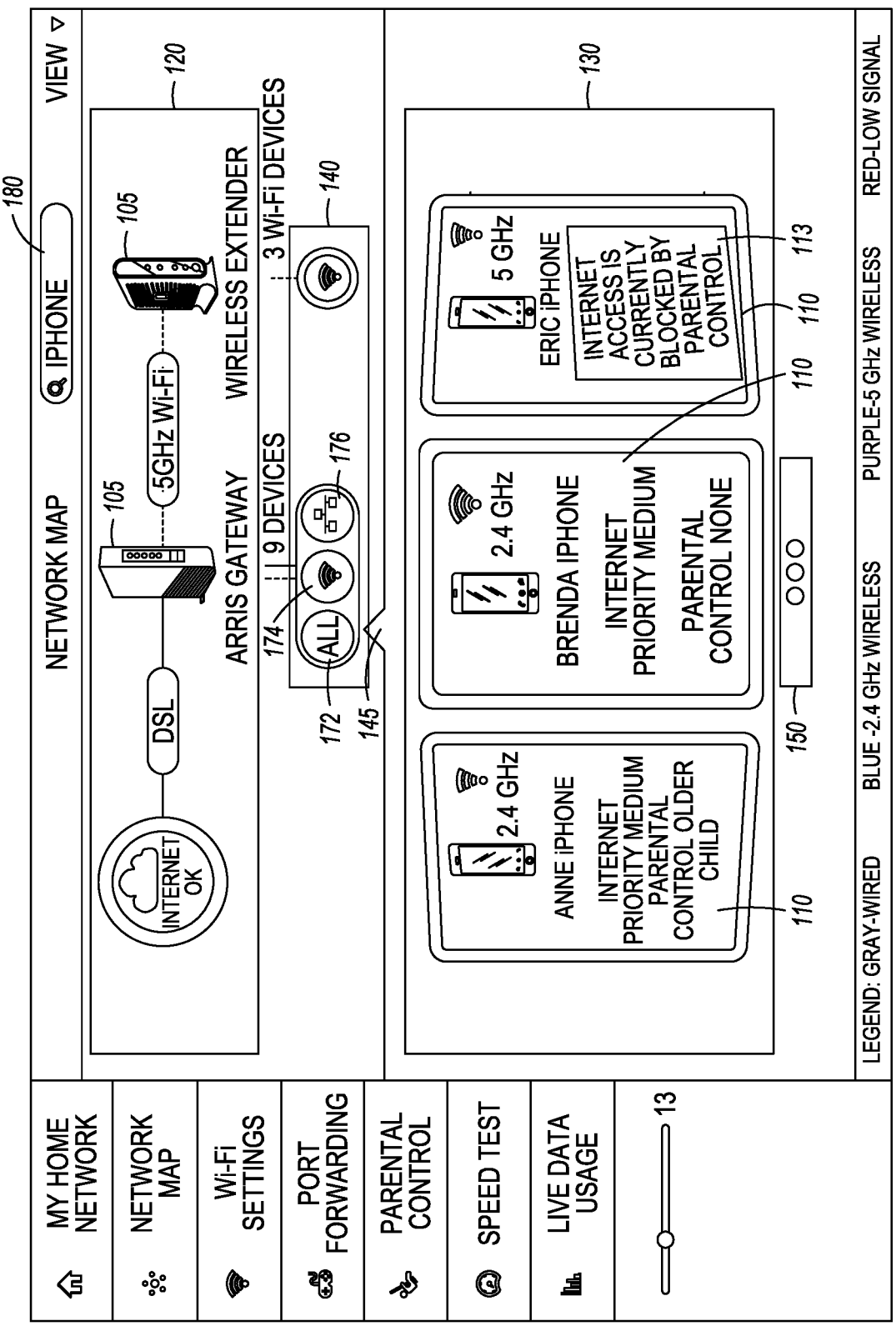
FIG. 6 shows another example of a network map in which a user has used the search box to search for network devices having the search term "iphone."

In some embodiments the network map may include a search box such as the search box 180 shown in FIG. 2, which allows the user to locate a network device by keywords. The keywords that are searched may include those terms that are presented on the face of the cards and possibly additional fields that contain information not presented on the card face. In response to the search only those cards representing network devices that match the search terms will be presented in the appropriate carousel. For instance, as shown in FIG. 6, a search for the search term "iphone" causes the carousel 130 to only show the three cards that represent iphones.

The network map described herein may be created using network data that may be obtained in accordance with network discovery principles known in the art. For instance, the network discovery process may employ TR-069 (Technical Report 069), which is a technical specification that defines an application layer protocol for remote management of end-user devices. TR-069 provides communication between infrastructure devices and Auto Configuration Servers (ACS). Of course, alternative protocols may be employed as well.

Figure 7:
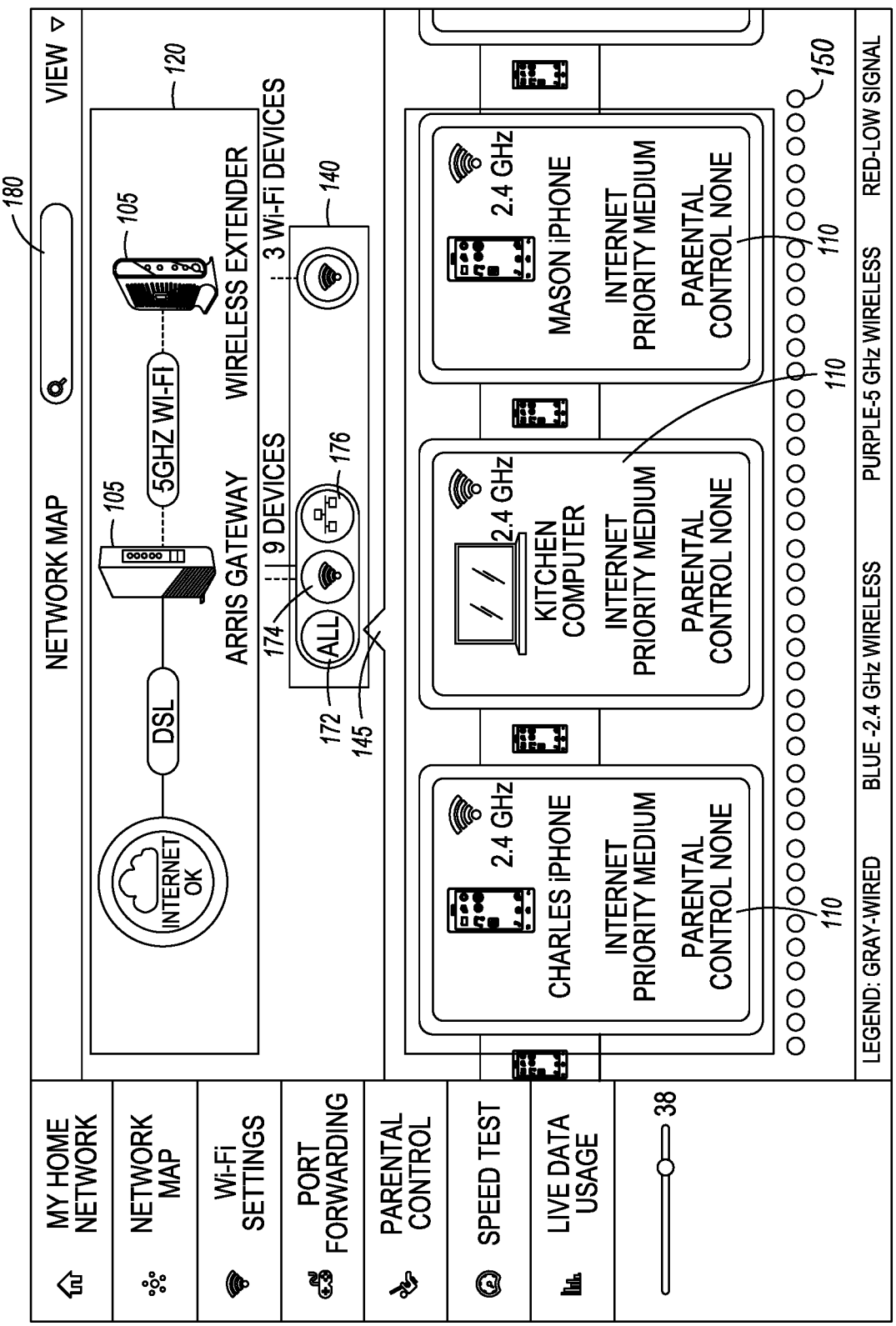
FIG. 7 shows another example of a network map for a network having 38 network devices.

The network map described herein offers a number of advantages over existing network maps that are presented in the form of a tree or graphs. For instance, the use of one or more carousels allows a reasonable number of network devices to be presented on a display, including small displays such as those found on mobile phones, while also reducing information overload. Moreover, the use in some embodiments of dual carousels, one for infrastructure devices and the other for terminal devices, allows the user to filter the devices based on the type of connection (e.g. Wi-Fi, Ethernet, MoCA . . . ). This reduces the need for examining the details of each network device and also provides a more cohesive view of the network. In addition, this network map design is highly scalable and can accommodate a large number of network devices. For instance, FIG. 7 shows a network map similar to that shown in FIG. 2, but with 38 network devices. Even with such a relatively large number of network devices, the network map remains convenient to read and easily navigable.

Aspects of the subject matter described herein are operational with numerous general purpose or special purpose computing system environments or configurations. Examples of well-known computing systems, environments, or configurations that may be suitable for use with aspects of the subject matter described herein comprise personal computers, server computers, hand-held, mobile or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, distributed computing environments that include any of the above systems or devices, and the like.

Aspects of the subject matter described herein may be described in the general context of computer-executable instructions, such as program modules or components, being executed by a computer. Generally, program modules or components include routines, programs, objects, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 8:
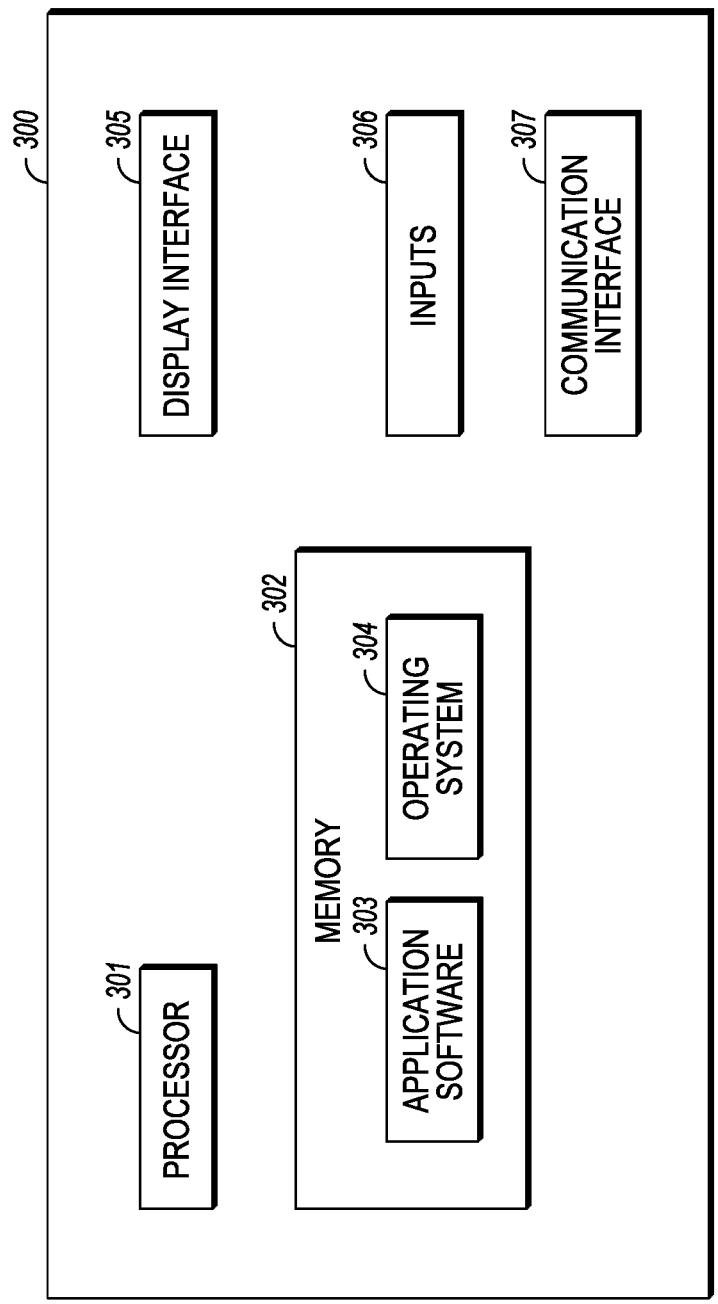
FIG. 8 illustrates various components of an illustrative computing-based device.

FIG. 8 illustrates various components of an illustrative computing-based device 300 which may be implemented as any form of a computing and/or electronic device, and in which embodiments of a network discovery application that creates a network map as described above may be implemented.

The computing-based device 300 comprises one or more inputs 306 which are of any suitable type for receiving media content, Internet Protocol (IP) input, activity tags, activity state information, resources or other input. The device also comprises communication interface 307 to enable the device to communicate with one or more other entity using any suitable communications medium.

Computing-based device 300 also comprises one or more processors 301 which may be microprocessors, controllers or any other suitable type of processors for processing computing executable instructions to control the operation of the device in order to provide a search augmentation system. Platform software comprising an operating system 304 or any other suitable platform software may be provided at the computing-based device to enable application software 303 to be executed on the device.

The computer executable instructions may be provided using any computer-readable media, such as memory 302. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 305 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described.

The invention claimed is:

1. A method for displaying a network map, comprising:
retrieving state information for a plurality of network devices in communication with a network, the plurality of network devices including infrastructure devices and terminal devices;
generating a topology map based on the retrieved state information;
causing a visual image of the topology map to be displayed on a display screen, the visual image including:
a first region including a first plurality of distinct content items arranged as a first rotatable carousel presented in a perspective view, the first rotatable carousel being configured to be scrolled in response to user input, at least some of the first plurality of distinct content items each being associated with one of the terminal devices and presenting information describing the terminal device with which it is associated including an identifier and a representative image of the terminal device with which each of the first plurality of distinct content items is respectively associated;
a connection type filter for limiting the first plurality of distinct content items in the first rotatable carousel to distinct content items that are associated with terminal devices having a user-specified type of network connection; and
a second region including a second plurality of distinct content items each being associated with one of the infrastructure devices and presenting information describing the infrastructure device with which it is associated including an identifier and a representative image of the infrastructure device with which each of the second plurality of distinct content items is respectively associated.

2. The method of claim 1, wherein the second plurality of distinct content items is arranged as a second rotatable carousel, the rotatable carousel being configured to be scrolled in response to user input.

3. The method of claim 1, wherein the first rotatable carousel is infinitely rotatable when scrolled in response to user input.

4. The method of claim 1, wherein the visual image is configured for display on a touch screen such that the first rotatable carousel is rotatable via user-directed movement across the touch screen.

5. The method of claim 1, wherein the connection type filter includes user-selectable icons, one of the icons representing a wireless network connection and another of the icons representing a wired network connection.

6. The method of claim 1, wherein the visual image further includes a device selector for rotating the first carousel so that a content item associated with a user-selected terminal device appears front and center on the display.

7. The method of claim 6, wherein the device selector includes a linearly arranged plurality of user-selectable icons that are each associated with one of the content items.

8. The method of claim 1, wherein at least one of the content items is user-selectable such that upon being selected by a user additional information concerning the terminal device or infrastructure device associated with the at least one content item is presented on the display.

9. The method of claim 8, wherein
the information describing the terminal devices or infrastructure devices further includes one or more of connection type, signal strength, setting, IP address, MAC address, parental control status, Internet priority and Internet usage, and
the additional information concerning the terminal device or infrastructure device associated with the at least one content item relates to an anomalous condition, state, status or error that is to be communicated to the user.

10. The method of claim 1, wherein the visual image further comprises a search box for searching information associated with the content items by performing a keyword search, the search box including a field to be populated by a user with one or more keywords.

11. One or more non-transitory computer-readable storage media containing instructions which, when executed by one or more processors perform a method comprising:
presenting on a display device a visual image of a topology map of a network that includes a plurality of network devices, the plurality of network devices including infrastructure devices and terminal devices, the visual image including
a first region including a first plurality of distinct content items arranged as a first rotatable carousel presented in a perspective view, at least some of the first plurality of distinct content items each being associated with one of the terminal devices and presenting information describing the terminal device with which it is associated including an identifier and a representative image of the terminal device with which each of the first plurality of distinct content items is respectively associated,
a connection type filter for limiting the first plurality of distinct content items in the first rotatable carousel to distinct content items that are associated with terminal devices having a user-specified type of network connection, and
a second region including a second plurality of distinct content items each being associated with one of the infrastructure devices and presenting information describing the infrastructure device with which it is associated including an identifier and a representative image of the infrastructure device with which each of the second plurality of distinct content items is respectively associated; and
responsive to user input, causing the first rotatable carousel to be rotated such that at least one content item among the first plurality of distinct content items comes into view on the display device which was not in view prior to receipt of the user input.

12. The one or more non-transitory computer-readable storage media of claim 11, wherein the second plurality of distinct content items is arranged as a second rotatable carousel.

13. The one or more non-transitory computer-readable storage media of claim 11, wherein the user input causes the first rotatable carousel to rotate infinitely in either a first or second direction.

14. The one or more non-transitory computer-readable storage media of claim 11, wherein the visual image is configured for display on a touch screen and further comprising causing the first rotatable carousel to rotate in response to user-directed movement across the touch screen.

15. The one or more non-transitory computer-readable storage media of claim 11, wherein the connection type filter includes user-selectable icons, one of the icons representing a wireless network connection and another of the icons representing a wired network connection.

16. The one or more non-transitory computer-readable storage media of claim 11, wherein the visual image further includes a device selector for rotating the first carousel so that a content item associated with a user-selected terminal device appears front and center on the display.

17. The one or more non-transitory computer-readable storage media of claim 11, wherein at least one of the content items is user-selectable and further comprising causing additional information concerning the terminal device or infrastructure device associated with the at least one content item to be presented on the display when the at least one content item is selected.

18. The one or more non-transitory computer-readable storage media of claim 17, wherein the information describing the terminal devices or infrastructure devices further includes one or more of connection type, signal strength, setting, IP address, MAC address, parental control status, Internet priority and Internet usage, and the additional information concerning the terminal device or infrastructure device associated with the at least one content item relates to an anomalous condition, state, status or error that is to be communicated to the user.

19. The one or more non-transitory computer-readable storage media of claim 11, wherein the visual image further comprises a search box for searching information associated with the content items by performing a keyword search, the search box including a field to be populated by a user with one or more keywords.

* * * * *